United States Patent
Ollagnier et al.

(10) Patent No.: US 11,921,231 B2
(45) Date of Patent: Mar. 5, 2024

(54) METHOD FOR MONITORING THE SURROUNDINGS OF A VEHICLE

(71) Applicant: SAFRAN ELECTRONICS & DEFENSE, Paris (FR)

(72) Inventors: Cédric Ollagnier, Moissy-Cramayel (FR); Isabelle Ollagnier, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 258 days.

(21) Appl. No.: 17/619,809

(22) PCT Filed: Jun. 12, 2020

(86) PCT No.: PCT/EP2020/066412
§ 371 (c)(1),
(2) Date: Dec. 16, 2021

(87) PCT Pub. No.: WO2020/254216
PCT Pub. Date: Dec. 24, 2020

(65) Prior Publication Data
US 2022/0349993 A1 Nov. 3, 2022

(30) Foreign Application Priority Data
Jun. 20, 2019 (FR) ........................................ 1906656

(51) Int. Cl.
*G01S 7/40* (2006.01)
*G01S 13/86* (2006.01)
(Continued)

(52) U.S. Cl.
CPC ................. *G01S 7/40* (2013.01); *G01S 13/86* (2013.01); *G01S 13/93* (2013.01)

(58) Field of Classification Search
CPC ............... G01S 7/12; G01S 7/22; G01S 7/414
See application file for complete search history.

(56) References Cited

U.S. PATENT DOCUMENTS 3,971,018 A * 7/1976 Isbister ................. G01S 13/937
342/183
4,623,966 A * 11/1986 O'Sullivan ............... G01S 7/24
342/182
(Continued)

FOREIGN PATENT DOCUMENTS

FR 2875613 A1 * 3/2006 ............... G01S 7/12
GB 2133256 A * 7/1984 ............... G01S 7/12
(Continued)

OTHER PUBLICATIONS

Entry for "NMEA 2000" on wikipedia.org; no author given; retrieved from wikipedia.org on Oct. 25, 2023. (Year: 2023).*

*Primary Examiner* — Bernarr E Gregory
(74) *Attorney, Agent, or Firm* — MUNCY, GEISSLER, OLDS & LOWE, PC

(57) ABSTRACT

A method and a device for monitoring a region (R) in which a carrier (100) is located, which device comprises a display unit displaying a polar plot (10) having a center symbolizing the current position of the carrier (100) and in which there is placed a first moving-body symbol (1, 2, 3) representing the current position of the moving body (101, 102, 103); the polar plot (10) being surrounded by an annular band (20) of width (l) representing a predetermined monitoring duration and containing second moving-body symbols (1', 2', 3') representative of successive angle readings of the path of said moving body (101, 102, 103).

14 Claims, 2 Drawing Sheets

(51) Int. Cl.
*G01S 13/93* (2020.01)
*G01S 13/00* (2006.01)

(56) References Cited

U.S. PATENT DOCUMENTS

| | | | | |
|---|---|---|---|---|
| 5,268,690 A | * | 12/1993 | Shibata | G01S 7/22 |
| | | | | 342/183 |
| 6,522,289 B1 | | 2/2003 | Frerichs et al. | |
| 2011/0063163 A1 | | 3/2011 | Kojima et al. | |
| 2014/0043185 A1 | * | 2/2014 | Quellec | G01S 7/414 |
| | | | | 342/146 |
| 2014/0104100 A1 | * | 4/2014 | Kubota | G01S 7/22 |
| | | | | 342/182 |
| 2014/0306997 A1 | | 10/2014 | Kubota et al. | |

FOREIGN PATENT DOCUMENTS

| | | |
|---|---|---|
| JP | S63108288 A | 5/1988 |
| WO | WO-2006/035305 A2 | 4/2006 |

\* cited by examiner

METHOD FOR MONITORING THE SURROUNDINGS OF A VEHICLE

BACKGROUND OF THE INVENTION

The present invention relates to the field of preventing collisions with moving bodies, and more particularly between vehicles.

Traditionally, at sea, ships used to have mounted thereon a "pelorus" comprising a device or "alidade" for taking bearings and suitable for pointing at a moving body in order to verify how the relative bearing of that moving body varies: if the relative bearing of the moving body does not vary, that means there is a risk of collision.

Nowadays, ships are fitted with automatic means for monitoring their surroundings, means that comprise a radar, a radio automated identification system (AIS), and an optical lookout device.

Most radars are fitted with software for processing echoes in order to calculate the relative bearing and the distance of a moving body relative to the carrier vehicle, the speed of the moving body, and a closest point of approach (CPA) that is used for determining the risk of collision. Nevertheless, the closest point of approach is calculated on the assumption that the moving body is moving in a straight line at the calculated speed, which assumption might be erroneous.
Object of the Invention A particular object of the invention is to improve the prevention of collisions.

SUMMARY OF THE INVENTION

To this end, there is provided a method of monitoring a region in which a carrier is located, the method comprising the steps of:

using at least one sensor of a first type to detect successive positions of a moving body following a path in said region; and displaying a polar plot having a center symbolizing the current position of the carrier and having placing thereon a first moving-body symbol representing the current position of the moving body as a function of the bearing angle and of the distance of the moving body relative to the carrier.

According to the invention, the method further comprises the steps of:

displaying an annular band around the polar plot, the band being of width that represents a predetermined monitoring duration; and placing second moving-body symbols in the annular band, the second symbols representing successive readings of angles along the path of the moving body, the annular band having an inner outline corresponding to a recent time and an outer outline corresponding to a past time preceding the recent time by a duration equal to the predetermined monitoring duration, and the second moving-body symbols being placed closer to the outer outline of the annular band with increasing age of the corresponding angle readings.

The angle readings are bearing angles of the moving body relative to the carrier, or azimuths of the moving body. Thus, the polar plot serves to visualize the positions of the moving bodies relative to the carrier on a spatial scale, while the annular band provides a time scale serving to visualize the directions followed by the moving bodies relative to the carrier, and thus serves to assess any risk of collision between the moving bodies and the carrier.

The invention also provides an above method in which carrier symbols representing successive positions of the carrier during the predetermined monitoring duration are placed in the annular band in order to show any variation in the azimuth of the carrier during the predetermined monitoring duration, the carrier symbols being placed closer to the outer outline of the annular band with increasing age of the corresponding position.

In another implementation, the positions of the moving body are also detected by at least one sensor of a second type, the sensor of the first type determining the position of the moving body in a first reference frame and the sensor of the second type determining the position of the moving body in a second reference frame, the method including the step of normalizing the first and second reference frames, with the positions of the moving body that are used for positioning the first and second moving-body symbols resulting from a combination of the positions detected by both sensors.

The invention also provides a device for monitoring a region in which a carrier of the device is located, the device comprising a computer unit for processing data, which unit is connected to a display unit and to a data bus conveying position data of moving bodies that are located in the region of the carrier, the computer unit for processing being programmed to perform the method of the invention.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 1:
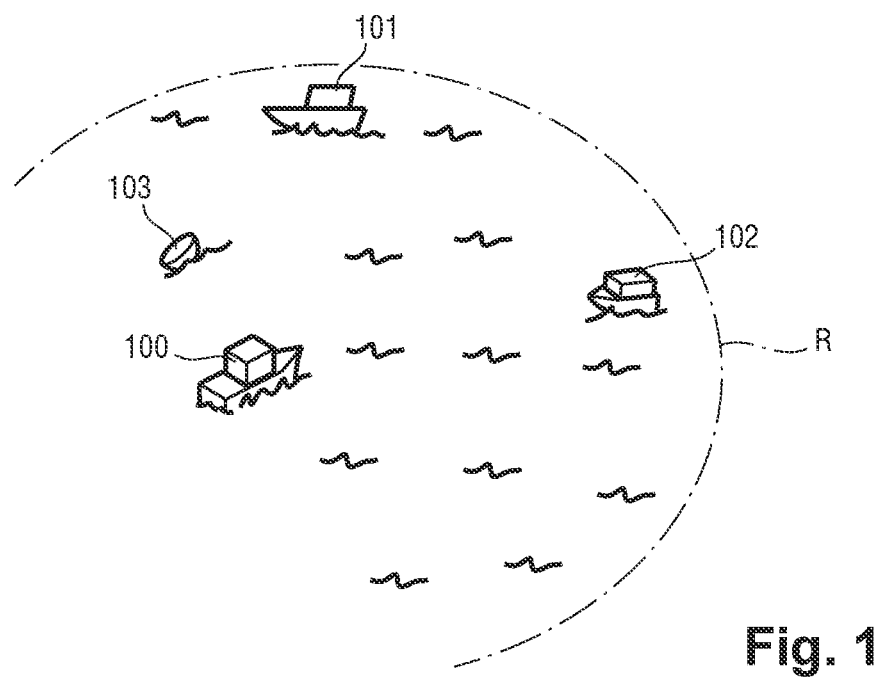
FIG. 1 is a diagrammatic perspective view of a ship provided with a device suitable for performing the invention.
Figure 2:
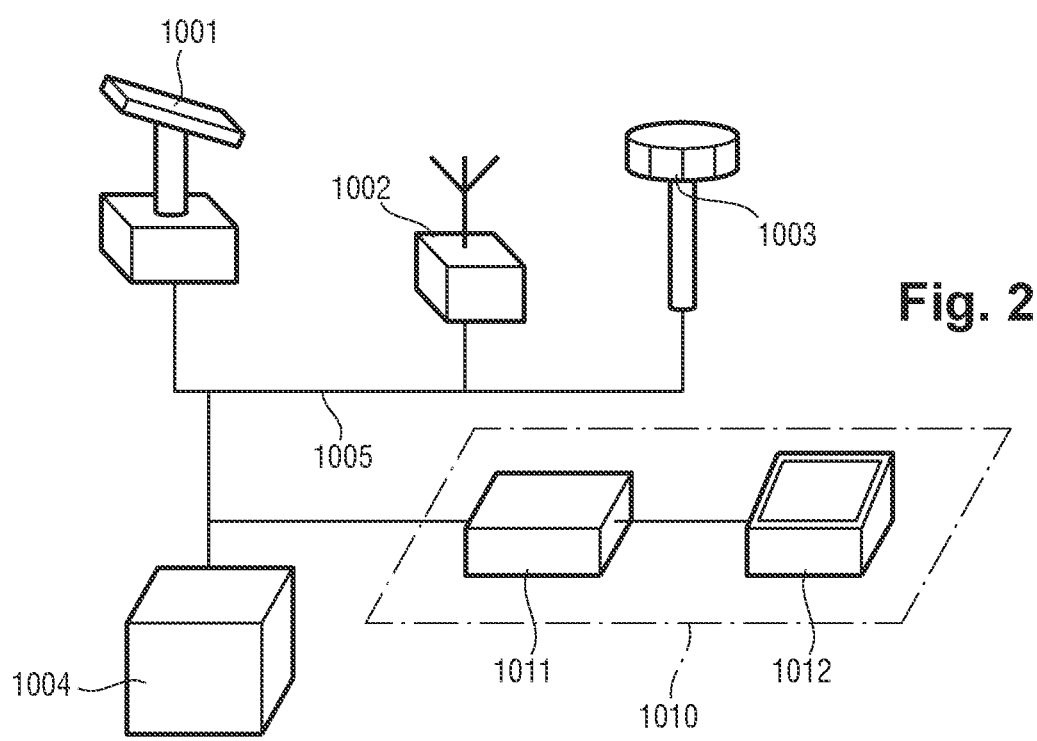
FIG. 2 is a diagrammatic perspective view showing the device.

With reference to the figures, the invention is described below in application to a ship or sensors carrier 100 travelling in a region R in which moving bodies 101, 102, and 103 are also to be found, specifically other ships.

The carrier 100 is provided with sensors of at least first, second, and third types, which sensors are arranged to determine the positions of the moving bodies respectively in a first reference frame, in a second reference frame, and in a third reference frame. More precisely, the carrier 100 is provided with a radar sensor 1001, with an automatic identification system (AIS) sensor 1002, and with an optical sensor 1003, which sensors are connected to a control unit 1004 of the carrier 100 by a data bus 1005 of National Maritime Electronics Association (NMEA) type for transmitting position data concerning the moving bodies 101, 102, and 103 to the control unit 1004. The sensors 1001, 1002, and 1003 are arranged and controlled to detect successive positions of the moving bodies 101, 102, and 103 in the region R and to deliver data corresponding to the position readings. The sensors are themselves known. It is merely recalled that the radar system comprises an incident radar signal transmitter and a reflected signal sensor serving to measure, in a polar reference frame, the relative bearing of a moving body (antenna orientation), the distance to the moving body (time-of-flight), and the speed of the moving body (Doppler effect); the AIS sensor picks up radio signals transmitted by the moving bodies and that contain the identity of each moving body, its declared position, and the route it is following in a geographical reference frame; and the optical sensor comprises one or more cameras operating in the visible domain and possibly in the infrared domain, and serving to measure the relative bearings of the moving bodies in a polar reference frame. The radar sensor 1001 and the AIS sensor 1002 enable the control unit to calculate closest points of approach (CPAs).

The carrier 100 is also provided with the device 1010 for monitoring the region R in which the carrier 100 is located. The device 1010 comprises a computer unit 1011 for processing data, which unit is connected to a display unit 1012 and to the data bus 1005. In known manner, the computer unit 1011 comprises a processor and a memory containing programs including instructions for performing the method of the invention.

The computer unit 1011 executes the following steps:

recovering the position data transmitted over the data bus 1005;

normalizing the first, second, and third reference frames, and calculating a consolidated position for each moving body 101, 102, and 103 by combining the positions as detected by the three sensors 1001, 1002, and 1003 for each of the moving bodies 101, 102, and 103;

determining any transverse movement of the moving bodies 101, 102, and 103 relative to the carrier 100;

displaying, on the display unit 1012, a polar plot 10 having a center symbolizing the current position of the carrier 100; and placing first moving-body symbols 1, 2, and 3 in the polar plot 10 representing the consolidated current position of each of the moving bodies 101, 102, and 103 as a function of the relative bearing angle and of the distance of each of the moving bodies 101, 102, and 103 relative to the carrier 100.

The computer unit 1011 executes the following steps:

displaying an annular band 20 around the polar plot 10, the band being of width l that represents a predetermined monitoring duration; and placing second moving-body symbols 1', 2', and 3' in the annular band 20 that represent successive relative bearing angles for each of the moving bodies 101, 102, and 103 relative to the carrier 100 to reveal any transverse movement of each of said moving bodies 101, 102, and 103 relative to the carrier 100.

The angular reference of the annular band 20 is the same as that used for the polar plot 10. The predetermined monitoring duration depends on the speed of the carrier 100 and on the speeds of the moving bodies that might be moving in the region. At sea, the predetermined monitoring duration may be 30 minutes, or even 15 minutes, for example. The annular band 20 has an inner outline 21 corresponding to a recent time and an outer outline 22 corresponding to a past time preceding the recent time by a duration equal to the predetermined monitoring duration, and the second moving-body symbols 1', 2', and 3' are placed progressively closer to the outer outline 22 of the annular band 20 with increasing age of the corresponding relative bearing angle (relative bearing angles older than the predetermined monitoring duration not being shown any longer). The inner outline 21 of the annular band 20 is placed at a distance from the center of the polar plot 10 that corresponds, in the polar plot, to the optical horizon of the optical sensor 1003. By way of example, the optical horizon is at a distance of about 20 nautical miles.

Also, carrier symbols 0' representing successive headings of the carrier 100 during the predetermined monitoring duration are placed in the annular band 20 so as to show up any variation in the azimuth of the carrier 100 during the predetermined monitoring duration. The carrier symbols 0' are placed closer to the outer outline 22 of the annular band 20 with increasing age of the corresponding heading (headings older than the predetermined monitoring duration no longer being shown).

Figure 3:
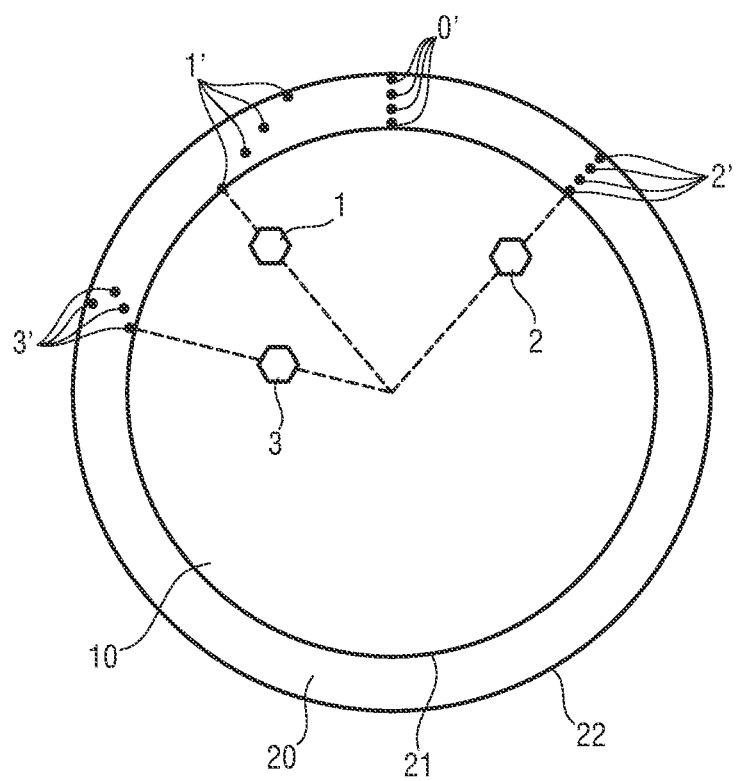
FIG. 3 is a view showing the display unit of the device and its display in accordance with the invention.

It can thus be understood that it is easy for an operator to detect any risk of collision. In FIG. 3, the operator can see that:

the carrier 100 has not changed heading (the carrier symbols 0' are in alignment on the current heading of the carrier);

the relative bearing angle of the moving body 102 is constant (the second moving-body symbols 2' are in alignment with the first moving-body symbol 2), which means that the transverse movement of the moving body 102 is zero, such that it represents a high risk of collision;

the moving body 101 presents transverse movement of less than 0 (the second moving-body symbols 1' are in alignment with a direction that forms a non-zero angle with the direction of the first moving-body symbol 1 relative to the carrier) such that the moving body 101 is not dangerous; and the moving body 103 presents transverse movement of sign that has changed (the most recent second moving-body symbols 3' are not in alignment with the other second moving-body symbols 3' even though the heading of the carrier 100 has not changed) such that the moving body 103 presents a potential risk of collision in the event of its heading changing again.

Finally, the computer unit 1011 executes:

a first level warning step when the transverse movement of at least one of the moving bodies 101, 102, or 103 is zero and the carrier 100 has not changed heading; and a second level warning step when the transverse movement of at least one of the moving bodies 101, 102, or 103 changes sign even though the carrier has not changed heading.

The warning it may be visual: a change of color, flashing, etc. The warning may be audible: e.g. ringing or a voice message.

The computer unit 1011 may also issue a warning about the reliability of the calculated closest points of approach whenever changes of sign are detected in the transverse movements of the moving bodies or of the carrier.

Naturally, the invention is not limited to the implementation described, but covers any variant coming within the ambit of the invention as defined by the claims.

In particular, the invention is applicable to any type of carrier, at sea, in the air, or on land. When the carrier is an aircraft, the data bus to which the computer unit is connected is the aviation data bus. In aviation, the predetermined monitoring duration may be 3 minutes, or even 1 minute, for example.

It should be observed that the second moving-body symbol may represent either the bearing angle of the moving body relative to the carrier, as in the example described, or else the heading being followed by the moving body. When it is headings that are represented, there is no need to have carrier symbols in the annular band in order to show changes in heading of the carrier, since any variation in the headings of the moving bodies is independent of any variation in the heading of the carrier.

The invention claimed is:

1. A method of monitoring a region in which a carrier is located, the method comprising the steps of:
   using at least one sensor of a first type to detect successive positions of a moving body following a path in said region; and
   displaying a polar plot having a center symbolizing the current position of the carrier and having placing thereon a first moving-body symbol representing the current position of the moving body as a function of the bearing angle and of the distance of the moving body relative to the carrier;
   the method being characterized in that it further comprises the steps of:
   displaying an annular band around the polar plot, the band being of width that represents a predetermined monitoring duration; and
   placing second moving-body symbols in the annular band, the second symbols being representative of successive readings of angles along the path of said moving body, the annular band having an inner outline corresponding to a recent time and an outer outline corresponding to a past time preceding the recent time by a duration equal to the predetermined monitoring duration, and the second moving-body symbols being placed closer to the outer outline of the annular band with increasing age of the corresponding angle readings.

2. The method according to claim 1, wherein the angle readings are bearing angles of the moving body relative to the carrier.

3. The method according to claim 1, wherein the angle readings are azimuths of the moving body.

4. The method according to claim 1, wherein carrier symbols representing successive positions of the carrier during the predetermined monitoring duration are placed in the annular band in order to show any variation in the azimuth of the carrier during the predetermined monitoring duration, the carrier symbols being placed closer to the outer outline of the annular band with increasing age of the corresponding position.

5. The method according to claim 1, wherein the positions of the moving body are also detected by at least one sensor of a second type, the sensor of the first type determining the position of the moving body in a first reference frame and the sensor of the second type determining the position of the moving body in a second reference frame, the method including the step of normalizing the first and second reference frames, with the positions of the moving body that are used for positioning the first and second moving-body symbols resulting from a combination of the positions detected by both sensors.

6. The method according to claim 5, wherein the positions of the moving body are also detected by a sensor of a third type.

7. The method according to claim 6, wherein the moving body is detected by means of a radar sensor, by means of an AIS sensor, and by means of an optical sensor.

8. The method according to claim 1, to wherein the moving body is detected by an optical sensor.

9. The method according to claim 8, wherein the inner outline of the annular band is placed at a distance from the center of the polar plot that corresponds, in the polar plot, to the optical horizon of the optical sensor.

10. The method according to claim 1, including a first level warning step when the transverse movement of the moving body is zero.

11. The method according to claim 10, including a second level warning step when the transverse movement of the moving body changes sign.

12. A device for monitoring a region in which a carrier of the device is located, the device comprising a computer unit for processing data, which unit is connected to a display unit and to a data bus conveying position data of moving bodies that are located in the region of the carrier, the computer unit being programmed to perform the method according to claim 1.

13. The device according to claim 12, wherein the carrier is a ship including an National Maritime Electronics Association (NMEA) type bus forming the data bus to which the computer unit is connected.

14. The device according to claim 12, wherein the carrier is an aircraft, and the data bus is an aviation data bus.

* * * * *